United States Patent
Linck et al.

(10) Patent No.: US 9,783,917 B2
(45) Date of Patent: Oct. 10, 2017

(54) SYSTEM AND METHOD FOR AIR ENTANGLEMENT

(71) Applicant: Goodrich Corporation, Charlotte, NC (US)

(72) Inventors: John Linck, Pueblo, CO (US); Jean-Francois Le Costaouec, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 547 days.

(21) Appl. No.: 14/300,013

(22) Filed: Jun. 9, 2014

(65) Prior Publication Data

US 2015/0354110 A1    Dec. 10, 2015

(51) Int. Cl.
| | |
|---|---|
| *D04H 1/498* | (2012.01) |
| *D04H 3/11* | (2012.01) |
| *D04H 18/04* | (2012.01) |
| *D04H 1/492* | (2012.01) |
| *D04H 1/4242* | (2012.01) |
| *D04H 1/43* | (2012.01) |
| *F16D 69/02* | (2006.01) |

(52) U.S. Cl.
CPC ............ *D04H 1/498* (2013.01); *D04H 1/4242* (2013.01); *D04H 1/43* (2013.01); *D04H 1/492* (2013.01); *D04H 3/11* (2013.01); *D04H 18/04* (2013.01); *F16D 69/023* (2013.01)

(58) Field of Classification Search
CPC ........ D04H 18/00; D04H 1/4242; D04H 3/05; D04H 3/11; D04H 18/04; D04H 1/465; D04H 1/48; D04H 1/49; D04H 1/492; D04H 1/495; D04H 1/498; D04H 5/02; D04H 5/03; D04H 1/46; D04H 3/102; D04H 3/105; D04H 18/02; D04H 1/43; D04H 1/70; D04H 1/74; D04H 1/76; F16D 69/023
USPC .................................................... 28/104, 105
See application file for complete search history.

(56) References Cited

U.S. PATENT DOCUMENTS

| | | | | |
|---|---|---|---|---|
| 2,862,251 A | * | 12/1958 | Kalwaites | D21F 11/00 162/114 |
| 3,333,315 A | * | 8/1967 | Dyer | D04H 3/10 28/104 |
| 3,422,510 A | * | 1/1969 | Frate | D04H 3/10 19/65 R |
| 3,750,237 A | * | 8/1973 | Kalwaites | D04H 1/74 28/105 |

(Continued)

FOREIGN PATENT DOCUMENTS

| | | |
|---|---|---|
| EP | 0683261 | 11/1995 |
| EP | 2341175 | 7/2011 |

(Continued)

OTHER PUBLICATIONS

Extended European Search Report dated Sep. 14, 2015 in European Application No. 15171242.9.

*Primary Examiner* — Amy Vanatta

(74) *Attorney, Agent, or Firm* — Snell & Wilmer L.L.P.

(57) ABSTRACT

A circular air entangling system may comprise a bed plate for receiving fiber layers. An air entangling module may entangle the fiber layers with one another and a fiber packaging apparatus may transport the fiber layers for further processing. In this manner, a fiber preform may be constructed.

15 Claims, 6 Drawing Sheets

(56) References Cited

U.S. PATENT DOCUMENTS

| | | | | |
|---|---|---|---|---|
| 3,873,255 | A * | 3/1975 | Kalwaites | D04H 5/03 28/104 |
| 6,105,223 | A * | 8/2000 | Brown | D04H 1/46 28/107 |
| 6,363,593 | B1 * | 4/2002 | Duval | D04H 18/00 28/107 |
| 2005/0172465 | A1 * | 8/2005 | Duval | B29B 11/16 28/101 |
| 2005/0235471 | A1 * | 10/2005 | Delecroix | D04H 1/498 28/107 |
| 2011/0081816 | A1 * | 4/2011 | Halstead | D04H 1/4242 442/388 |
| 2011/0277284 | A1 * | 11/2011 | Muenstermann | D04H 1/02 28/104 |
| 2015/0337468 | A1 * | 11/2015 | Le Costaouec | D04H 1/48 28/108 |
| 2016/0215422 | A1 * | 7/2016 | Rademacker | D04H 1/4242 |
| 2016/0265611 | A1 * | 9/2016 | Simpson | D04H 1/46 |

FOREIGN PATENT DOCUMENTS

| | | |
|---|---|---|
| JP | 2002003280 | 1/2002 |
| WO | 9849382 | 11/1998 |
| WO | 2007007045 | 1/2007 |
| WO | 2007048946 | 5/2007 |
| WO | 2009063210 | 5/2009 |
| WO | 2013074591 | 5/2013 |

* cited by examiner

SYSTEM AND METHOD FOR AIR ENTANGLEMENT

FIELD

This disclosure generally relates to creation of fiber preforms, and more particularly to the creation of fiber preforms produced by air entanglement.

BACKGROUND

Carbon/carbon ("C/C") parts are employed in various industries. An exemplary use for C/C parts includes using them as friction disks such as aircraft brake disks, race car brake disks, clutch disks, and the like. C/C brake disks are especially useful in such applications because of the superior high temperature capability, light weight, stable friction performance and/or other characteristics of the C/C material. In particular, the C/C material used in C/C parts such as aircraft brakes is a good conductor of heat and thus is able to dissipate heat away from the braking surfaces that is generated in response to braking. C/C material is also highly resistant to heat damage, and is thus capable of sustaining friction between brake surfaces during severe braking, without a significant reduction in the friction coefficient or mechanical failure.

C/C material is generally formed by utilizing continuous carbon fiber or oxidized polyacrylonitrile (PAN) fibers, referred to as "OPF." Such OPF fibers are the precursors of carbonized PAN fibers and are used to fabricate a preform shape using a needle punching process. OPF fibers are layered in selected orientations into a preform of a selected geometry. Typically, two or more layers of fibers are layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

In typical OPF preforms used for production of aircraft brake preforms, z-fibers are created by transferring in-plane fibers into the z-direction by needling. Z-directions fibers are created due to the high elongation characteristics of the OPF. OPF maintains elongation values in the range of 12-14%. Carbon fibers on the other hand have elongation values that are typically less than 1%. Thus, needling operations do not effectively create a z-fiber; carbon fibers break well before a z-fiber is created. Higher needling levels can be employed however higher needling tends to break up the carbon fibers thus reducing in plane mechanical properties and negatively impacting friction and wear properties. Methods have been employed to incorporate short fiber mats or discontinuous fiber forms into the preform to facilitate z-fiber transfer but these require a second fiber form which increases fabrication cost and complexity.

A circular needle loom may be utilized to form a circular preform, for example, for use in creating carbon brake disks. Various textile technologies exist for fabricating continuous fiber feed forms for a circular needle loom, including yarn placement, stitch bonding, pre-needling, and loom weaving with conical take-up rolls. Narrow fabric or other weaving looms may be utilized to produce a continuous spiral textile tapes to be utilized in a circular needle loom to form a circular preform. These spiral textiles may contain circumferential fibers that lie along the length of the textile, and off-axis fibers that lie along the width of the textile.

Significantly, prior art systems and methods for manufacturing circular preforms suffer from inefficiencies in the manufacturing process. For example, the needling process often tears and breaks up fibers and while displacing fibers may inadequately entangle the fibers to create a preform having desired strength properties.

SUMMARY

An entangling system is disclosed. An entangling system may include a bed plate whereon a first preform fiber layer accumulates, and an air entangling module configured to direct a jet of air toward the first preform fiber layer. The entangling system may further include a fiber packaging apparatus configured to transport the first preform fiber layer and a second preform fiber layer.

Moreover, the entangling system may include a tow delivery apparatus comprising a first roller set configured to receive the first preform fiber layer and guide the first preform fiber layer onto the bed plate and a second roller set configured to receive the second preform fiber layer and guide the second preform fiber layer onto the bed plate.

A method for air entangling a textile is also disclosed. A method for air entangling a textile to create a preform may include receiving the textile on a bed plate of an entangling loom, translating the textile around the circular entangling loom, and depositing a predetermined number of layers of the textile on the bed plate. The method may also include directing air through the textile to entangle at least two of the predetermined number of layers of the textile.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers, tows and yarns (and their orientations) in practice are very small and closely packed, the figures herein may show exaggerated and/or idealized fiber width and spacing in order to more clearly illustrate the fiber orientations and shape of the bundles.

DETAILED DESCRIPTION

Figure 1:
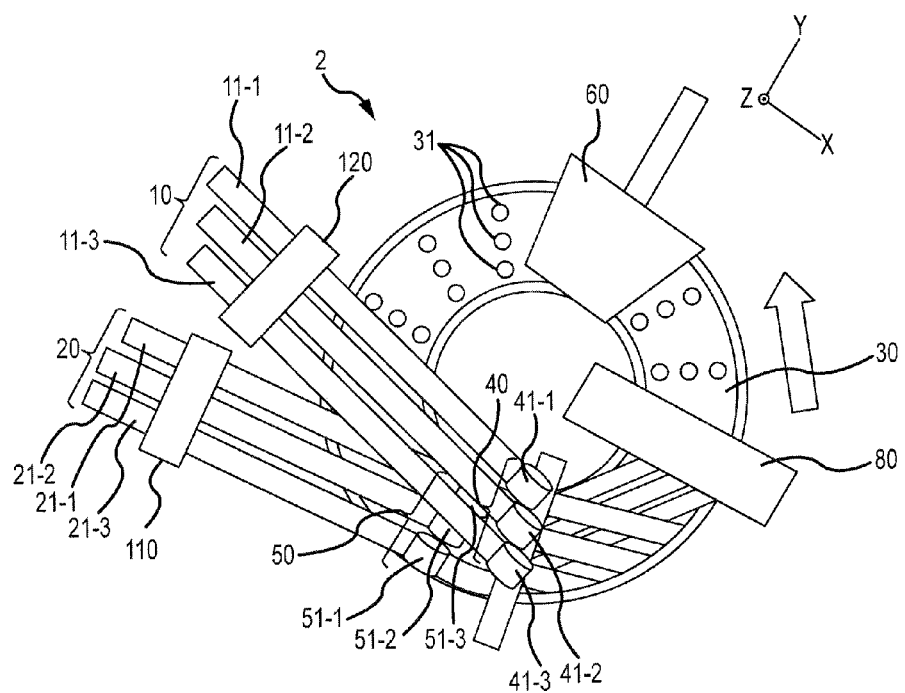
FIG. 1 illustrates a top view of an example air entanglement system according to various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

C/C material for use in aircraft braking systems is generally formed by utilizing continuous oxidized polyacrylonitrile (PAN) fibers, referred to as "OPF" fibers. Such OPF fibers are the precursors of carbonized PAN fibers. C/C brake disks are also made using carbon fiber/phenolic prepregs and densified by either multiple infiltration/pyrolysis cycles or by CVI. Thus, while some embodiments herein are discussed with reference to OPF, C/C brake disks may also be made by starting with carbon fiber as opposed to OPF. C/C disks manufactured using carbon fibers may comprise woven carbon fiber fabrics in a phenolic resin matrix which is the pyrolyzed to convert the matrix to carbon char. The fibers may be used to fabricate a preform shape using an entanglement process, for example, as discussed further herein with reference to various embodiments that use fluids such as air to orientate and/or entangle the fibers and/or fiber layer(s). Fibers are layered in a selected orientation into a preform of a selected geometry. Two or more layers of fibers may be layered onto a support and are then entangled together simultaneously or in a series of entangling steps. This process interconnects the horizontal fibers with a third direction (also called the z-direction). The fibers extending into the third direction are also called z-fibers. This entangling process may involve directing jets of air into the fibrous layers to displace a portion of the horizontal fibers into the z-direction.

Thus, a fabric layer and subsequent carbon fiber preform may be produced using air entanglement by first combining or stacking multiple fiber layers into a single layer and then consolidating or entangling these layers using air entanglement to produce a multi-dimensional fabric including z-fibers. The multi-dimensional air entangled preform can be a rectangular fabric or fabric strip, or a spiral fabric that would then feed a circular needle loom to produce a net shape preform disk.

As used herein, the terms "tow" are used to refer to one or more strands of substantially continuous filaments. Thus, a "tow" may refer to a plurality of strands of substantially continuous filaments or a single strand of substantially continuous filament. "Fiber bundle" may refer to a tow of substantially continuous filaments. "Fiber bundle" may also refer to various formats of narrow strips of stretch broken fibers. A "textile" may be referred to as a "fabric" or a "tape" and a "textile" may refer to constituent elements of a preform such as "tows" or "layers." A "loom" may refer to any weaving device, such as a circular air entanglement loom discussed herein.

As used herein, the term "ribbon" is used to refer to a closely packed bundle of continuous filaments and discontinuous filaments like stretch broken fibers generally delivered from a spool. A "span" as used herein may be a length of ribbon and/or tow. As used herein, the term "yarn" is used to refer to a strand of substantially continuous fibers or staple fibers or blends of these, thus the term "yarn" encompasses tow and cable. As used herein, the unit "K" represents "thousand." Thus, a 1K tow means a tow comprising about 1,000 strands of substantially continuous filaments. For example, a "heavy tow" may comprise about 48,000 (48K) textile fibers in a single tow, whereas a "medium tow" may comprise about 24,000 (24K) textile fibers within a single tow whereas a "lighter tow" may comprise about 6,000 (6K) textile fibers within a single tow. Fewer or greater amounts of textile fibers may be used per tow in various embodiments. In various embodiments disclosed herein, fabrics in accordance with various embodiments may comprise tows of from about 0.1K to about 100K, and, in various embodiments, heavier tows. As is understood, "warp" or "circumferential" fibers are fibers that lie in the "warp" or "circumferential" direction in the textile, i.e., along the length of the textile. "Weft" fibers are fibers that lie in the "weft" or "radial" direction in the textile, i.e., along the width of the textile. "Weft" fibers are a subset of "off-axis" or "radial" fibers which lie in the "off-axis" direction in the textile, i.e., in a direction not parallel with the "warp" direction. Warp fibers may be described as being spaced apart with respect to the weft direction (i.e., spaced apart between the outer diameter (OD) and inner diameter (ID) of the textile). Warp fibers or circumferential fibers may similarly be described as being spaced apart with respect to the "off-axis" direction (i.e., spaced apart between the outer diameter (OD) and inner diameter (ID) of the textile, but not running orthogonal and/or normal to the weft direction). Similarly, the weft tows and the "off-axis" tows may be described as being spaced apart with respect to the circumfrential direction.

In various embodiments, any combination of circumferential and off-axis tow size may be used. For example, 48K circumferential tows may be used with 24K off-axis tows. Also for example, other combinations of circumferential tows to off-axis tows include: 48K:12K, 24K:24K, and 24K:12K. A ribbon/carbon fiber tow may be wrapped around a round spool for ease of transport and feeding into a weaving apparatus for fabricating a fabric that is used in a subsequent preforming process using air entanglement. The ribbon on the spool comprises a generally closed packed rectangular cross sectional shape. A length of ribbon may be delivered from the spool to the weaving apparatus. In response to being manipulated under tension by a weaving apparatus, the generally rectangular shaped cross section of the ribbon changes to a generally oval or round shaped cross section. This oval or round shaped cross section is undesirable and a preferred approach is to spread the ribbon in the Y direction to increase the width, W, of the ribbon to increase coverage and reduce fiber volume. The ribbon may be spread mechanically through passage over and under specially shaped bars, for example, banana bars. In the alternative, the ribbon may be spread via vacuum suction or through ultrasonic vibration. Bulk may optionally be provided to the tow through the use of an air jet, thus re-orienting a portion of the fibers and providing greater volume to the tow ("volumizing" the tow).

Furthermore, in various embodiments, like the manufacturing of C/C friction disks where the dry fabric may be subsequently transformed into a 3D fiber structure, such as through an air entanglement process, looser spread tows and/or volumized tows are more conducive to the fabrication of a textile preform with a homogeneous fiber distribution within each horizontal plane of the textile.

During fabrication of annular preforms, such as those used in aircraft brake preforms, it is desirable, in addition to fiber orientations, to control the shape and the fiber volume of the carbon fiber tows during the various textile steps preceding the air entangling step. Looser/bulkier spread tows are more conducive to the fabrication of a textile brake preform exhibiting a homogeneous fiber distribution within each horizontal plane of the textile. Furthermore, the use of flat spread tows allows the fabrication of low areal weight fabrics with full fiber coverage using larger tows such as tows between 12 k to 50K.

According to various embodiments of an entangling system, stationary and/or movable bed plates in a circular air entangling loom (referred to herein as a "circular entangling loom" or "CEL") may be utilized to produce net shape preforms, such as net shape carbon preforms for brakes. Such circular entangling looms may be advantageously utilized to form a near net shape air entangled preform with minimum waste. Stationary bed plates may be smooth bed plates, such that the spiral textile rotates over, and with respect to, the stationary bed plate to facilitate layering and/or entangling the textile. Movable bed plates may be rotatable bed plates that comprise a surface that generates friction between the bed plate and the spiral textile such that the bed plates move and/or entrain the spiral textile to facilitate layering and/or entangling the textile. The circular entangling loom comprises an entangling zone directly beneath an air entanglement module (discussed further herein), and the spiral textile is entrained through the entangling zone to facilitate creating the preform. The air entangling zone of a stationary or moveable bedplate may comprise holes or some other thin porous material or a combination of holes and a thin porous material whereby air is allowed to flow from one or more sets of air jets to impinge on the textile to facilitate fiber entanglement.

Thus, carbon fiber tows may be fed into a loom to create circumferential orientation fibers and/or radial orientation fibers and/or non-circumferential orientation fibers. Stretch broken or continuous fibers may be placed at various orientations over the circumferential fibers using a fiber placement process. These two or more layers of fiber may then be air entangled to create a single spiral fabric layer having circumferential and off-axis (e.g., not circumferential) fibers, such as radial fibers. The air entangled spiral fabric may be fed onto a rotating turntable with each subsequent layer air-entangled with the previous layer(s) until a sufficient number of layers are stacked and air-entangled to achieve the desired preform thickness. Air entanglement may be controlled by the size of the air-jet holes of the air entanglement module, the air pressure of the air jets, and the orientation of the jets relative to the fabric or fiber, and/or by other mechanisms. At both stages, a vacuum source may be applied to or under the fabric or preform and surround the air-entanglement zone to collect loose and stray fibers from getting to the operator and other equipment and facilitate air movement through the fabric or preform being air entangled.

Thus, tows may be fed in a relaxed state to enhance individual fiber movement under the pressurized air jets. The tows may be pre-bulked with compressed air, and spread with banana bars. Then, relatively unconstrained within a given layer, the tows may be overfed as the layer is being built so that extra tow length in some of the fibers allows Z-axis movement during entanglement. Moreover, compressed air jets have a finite working distance depending on the air volume and pressure. In various embodiments, each layer of finished preform is desired to have a minimum target fiber volume, for example a 21% (+/−5%) fiber volume, thus the air must be effective in penetrating sufficient number of layers having at least this minimum fiber volume. Thus, an air entanglement module may have portions on both sides of the textile to enhance securing several layers to form a coherent fabric, or building preforms comprising many layers. (See FIG. 2). Alternatively, or in addition, the preform may be assembled in a relatively uncompressed state, facilitating entanglement, after which the preform is compressed to adjust to a targeted fiber volume. For example, a layer by layer and/or multi-layer by multi-layer construction method may comprise assembling multiple layers of very low fiber volume, entangled at once from both sides, then following transportation to other machines or processes, compressed to achieve targeted preform fiber volume.

Figure 2A:
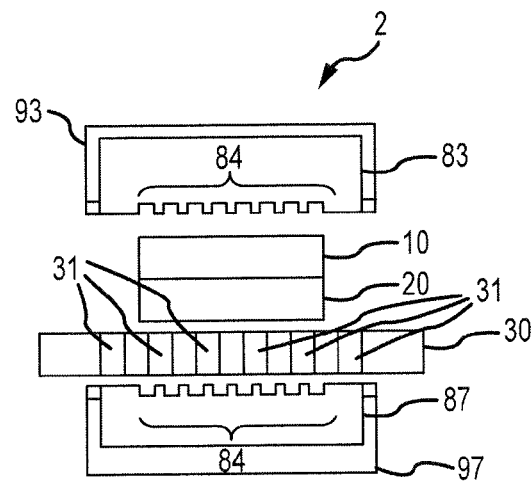
FIG. 2A-C illustrates side views of various aspects of an air entanglement system according to various embodiments.
Figure 2B:
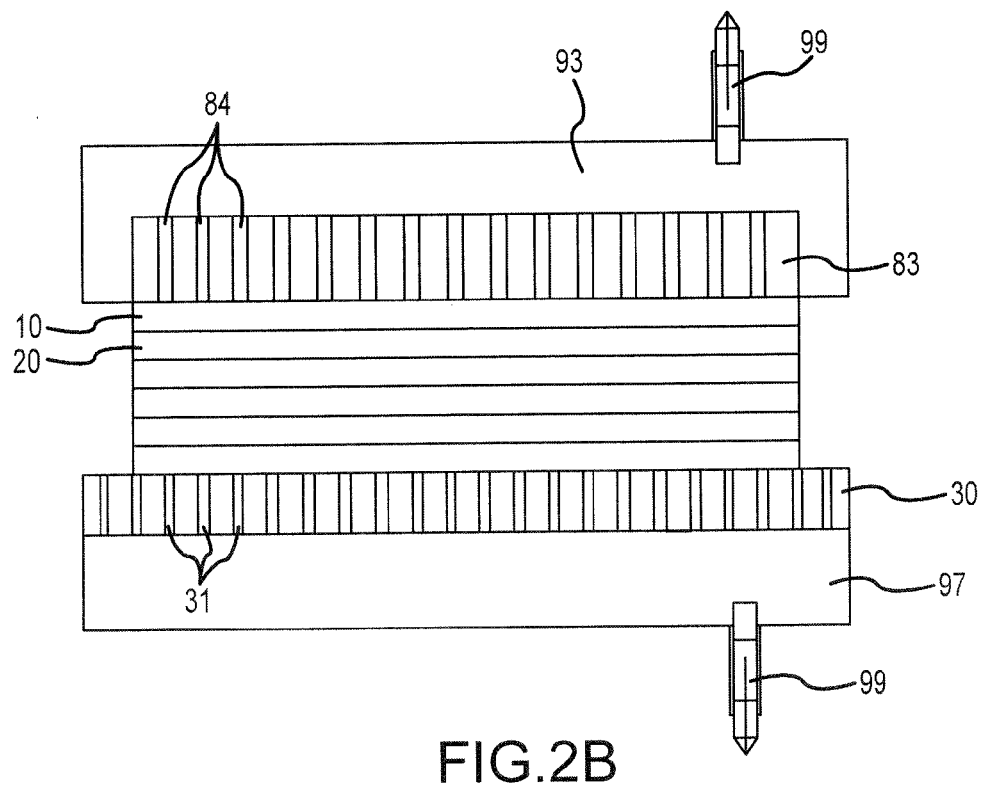

According to various embodiments, and with reference to FIGS. 1 and 2A-B, an entangling system 2 may comprise a bed plate 30, a fabric packaging apparatus 60, and an air entanglement module 80. Moreover, an entangling system may comprise a drive apparatus comprising a first roller set 40 and a second roller set 50. Additionally, an entangling system 2 may comprise fiber bulking modules, for example a first fiber bulking module 110 and a second fiber bulking module 120.

A bed plate 30 may be annular and may comprise holes 31. In further embodiments, a bed plate 30 may comprise a permeable screen. A bed plate 30 may comprise any number and arrangement of holes 31. In further embodiments, a bed plate 30 may comprise a permeable screen and/or any number and arrangement of holes 31. Holes 31 may permit the passage of air through the bed plate 30, enhancing the entangling process. Two initial preform fiber layers for building on an entangling system 2 are depicted. As the bed plate 30 translates, for example, as an annular bed plate rotates, the preform fiber layers may accumulate on the bed plate 30, forming a stack of carbonized carbon fiber layers on which subsequent carbonized carbon fibers layers may be secured through air entanglement to build a preform.

Two initial preform fiber layers may be fed onto the bed plate 30 via roller sets. For example, a second preform fiber layer 20 may be fed via a second roller set 50 onto a bed plate 30 and a first preform fiber layer 10 may be fed onto the bed plate 30 directly atop the second preform fiber layer 20, via a first roller set 40. Stated differently, the second preform fiber layer 20 may be fed directly onto the bed plate 30 and the first preform fiber layer 10 may be laid down directly atop the second preform fiber layer 20. In various embodiments, any number of initial preform layers may be fed onto the bed plate 30 via roller sets. The bed plate 30 may rotate, carrying the first preform fiber layer 10 and the second preform fiber layer 20 under and/or through an air entangling module 80 wherein the two layers are entangled. An example embodiment depicted in FIG. 1 illustrates the first preform fiber layer 10 and the second preform fiber layer 20 having just entered into the air entangling module 80.

In various embodiments, the first preform fiber layer 10 comprises a series of tows 11-1, 11-2, and 11-3. Similarly, the second preform fiber layer 20 may comprise a series of tows 21-1, 21-2, and 21-3. In various embodiments, the second preform fiber layer 20 comprises circumferential orientation fibers. The first preform fiber layer 10 may be oriented at a targeted angle with respect to the second preform fiber layer 20 and thus may be off-axis orientation fibers. The first preform fiber layer 10 may comprise stretch broken or continuous fibers as discussed above. Alternatively, the second preform fiber layer 20 may comprise stretch broken or continuous fibers and/or the first preform fiber layer 10 may comprise circumferential orientation fibers. Thus, either preform fiber layer may comprise any arrangement of fibers. In various embodiments, the fibers are arranged into tows and the second preform fiber layer 20 comprises circumferential tows spaced in the off-axis direction and the first preform fiber layer 10 comprises off-axis tows spaced in the circumferential direction.

In further embodiments, the first preform fiber layer 10 comprises a loose pre-assembled fabric layer. Stated differently, the first preform fiber layer 10 may comprise a series of tows and/or multiple fiber layers which have previously been entangled. Similarly, the second preform fiber layer 20 may comprise a loose pre-assembled fabric layer. Stated differently, the second preform fiber layer 20 may comprise a series of tows and/or multiple fiber layers which have previously been entangled.

The first roller set 40 may comprise a series of rollers 41-1, 41-2, and 41-3 and similarly, the second roller set 50 may comprise a series of rollers 51-1, 51-2, and 51-3. In various embodiments, each roller comprises one or more wheels. For example, a roller may comprise two wheels, or may comprise three wheels or may comprise any suitable number of wheels. Each tow may be separately fed via its own roller. For example, tow 11-1 may be fed via roller 41-1, tow 11-2 may be fed via roller 41-2, tow 11-3 may be fed via roller 41-3, and similarly, tow 21-1 may be fed via roller 51-1, tow 21-2 may be fed via roller 51-2, and tow 21-3 may be fed via roller 51-3. In this manner, the two fiber layers may be stacked and oriented with respect to one another prior to entering the air entangling module 80.

In various embodiments, the first roller set 40 is translatable between the inner circumference and the outer circumference of the annular bed plate 30. In this manner, the first roller set 40 may move the first preform fiber layer 10, so the tows of the first preform fiber layer 10 may be positioned at variable angles with respect to the tows of the second preform fiber layer 20. For example, the first roller set 40 may translate back and forth so that the first preform fiber layer forms a zig-zag (e.g., various diagonal lines) with respect to the second preform fiber layer 20. Moreover, in various embodiments, the first roller set 40 may periodically translate between the inner circumference and the outer circumference of the bed plate 30 so that the first preform fiber layer 10 enters the air entangling module oriented at substantially 90 degrees relative to the second preform fiber layer 20, thus comprising off-axis tows. In this manner, the fibers comprising each preform fiber layer may be positioned differently and the preform fiber layer may be strengthened, and/or bending may be ameliorated.

Optionally, prior to being fed onto the bed plate 30, the first preform fiber layer 10 and the second preform fiber layer 20 may be pre-bulked with compressed air, for example, to increase the volume of each preform fiber layer and to make the fibers more amenable to translation and entanglement in future steps. For example, a first fiber bulking module 110 and a second fiber bulking module 120 may be disposed so that the first preform fiber layer passes through the first fiber bulking module 110 and the second preform fiber layer passes through the second fiber bulking module 120 prior to reaching other systems and/or components, for example a material take-up mechanism which may include the bed plate 30. Thus it may be said that the preform fiber layers may be entangled prior to placement on a bed plate 30.

Moreover, in various embodiments, and with reference to FIG. 2C the preform fiber layers are not subsequently air entangled upon the bed plate 30, but rather, the air entangling module 80 is disposed so that the first preform fiber layer and the second preform fiber layer both pass through an air entangling module 80 prior to reaching other systems and/or components, for example a material take-up mechanism which may include the bed plate 30. Thus it may be said that the preform fiber layers may be entangled prior to reaching other systems and/or components, for example a material take-up mechanism which may include the bed plate 30. Thus it may be said that the preform fiber layers may be entangled prior to placement on a bed plate 30.

Figure 2C:
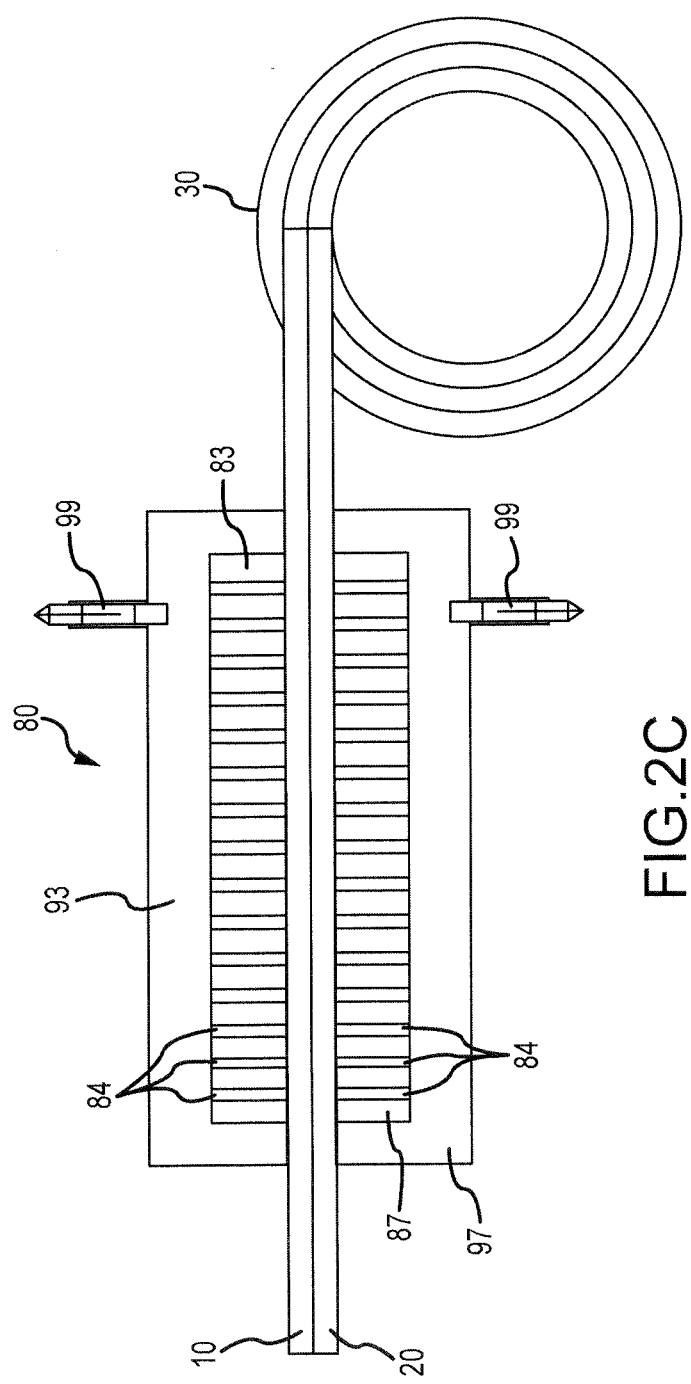

With reference to FIG. 2A-C, the air entangling module 80 may comprise an upper air entangling member 83 and a lower air entangling member 87. The upper air entangling member 83 may be positioned above the bed plate 30 (e.g., at a more positive position along the Z-axis) and the lower air entangling member 87 may be positioned below the bed plate 30 (e.g., at a more negative position along the Z-axis) (FIG. 2A). Thus, the air entangling module 80 may comprise two pieces and the bed plate 30 may extend between them. Alternatively, the air entangling module 80 may comprise only an upper air entangling member 83 (FIG. 2B), or may comprise only a lower air entangling member 87. In this manner, the air entangling module 80 may comprise any arrangement of different members. Moreover, with specific reference to FIG. 2C, in various example embodiments, as discussed above, the air entangling module 80 is disposed so that the first preform fiber layer and the second preform fiber layer both pass through the air entangling module 80 prior to reaching the bed plate 30.

With reference to FIG. 2A-C, the air entangling module 80 may also comprise an upper fiber containment enclosure member 93 and a lower fiber containment enclosure member 97. The upper fiber containment enclosure member 93 may be positioned over and around the upper air entangling member 83 and the lower fiber containment enclosure member 97 may be positioned over and around the lower air entangling member 87. The upper fiber containment enclosure member 93 and the lower fiber containment enclosure member 97 may restrict the escape of fibers, for example, loose and/or broken fibers, from the air entangling module 80. In various embodiments, the upper fiber containment enclosure member 93 may comprise a vacuum port 99 whereby a vacuum may be introduce to facilitate collection of the loose and/or broken fibers. Similarly, the lower fiber containment enclosure member 97 may comprise a vacuum port 99 whereby a vacuum may be introduce to facilitate collection of the loose and/or broken fibers.

The air entangling module 80 may expel jets of air toward the first preform fiber layer 10 and the second preform fiber layer 20. As additional layers are built up on top of the bed plate 30, the air entangling module 80 may expel jets of air toward these layers as well. The bed plate 30 may translate, for example, an annular bed plate may rotate, or the developing preform may be translated (e.g., rotated) on top of a fixed bed plate 30, so that the fiber layers pass through the air entangling module 80 and following entanglement, pass to a fabric packaging apparatus 60.

The fabric packaging apparatus 60 may comprise a transportation apparatus. For example, the fabric packaging apparatus 60 may comprise a mechanism whereby the fabric is transported to another step, for example, by spooling onto a conical mandrel or by spooling into a circular stack, or otherwise prepared for transportation to another step, such as a second entangling system, or a compression apparatus, or any other system.

The fabric packaging apparatus 60 may package the layers such as by winding on a conical support, and the layers may be compressed by another step or process. Other steps or processes may compress, shape, cut, form, or otherwise treat and/or package two or more layers of a preform following air entanglement. Thus, the fabric packaging apparatus 60 may redirect the layers from the entangling system 2 to another apparatus or process. For example, in various embodiments, the fabric packaging apparatus 60 forms the layers into a fabric, for transportation to another apparatus or process, such as another CEL and/or bed plate and/or other apparatus where the fabric is formed into a preform.

Figure 3:
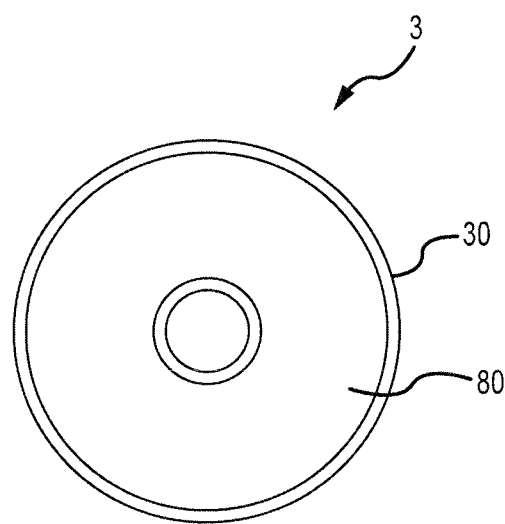
FIG. 3 illustrates a top view of an example air entanglement system having an annular air entanglement module according to various embodiments.

While FIG. 1 depicts an air entangling module 80 extending above only a portion of the bed plate 30, FIG. 3 depicts further embodiments wherein the air entangling module 80 may comprise an annulus aligned on the same central axis as the bed plate 30. In this embodiment, the entire annulus of the preform is air entangled simultaneously. Thus, the fiber layers do not pass through the air entangling module 80 as in the embodiment according to FIG. 2A-C, but rather, the entire annulus is entangled simultaneously. The air entangling module may have an upper air entangling member and a lower air entangling member similar to the embodiment of FIG. 2A-C, or may have only an upper air entangling member, or may have only a lower air entangling member.

Turning in detail to an air entangling module 80, an air entangling module 80 may comprise jets 84. A jet 84 may comprise an orifice through which compressed air is accelerated to high velocity and expelled. An air entangling module 80 may comprise any number of jets 84 and may comprise jets 84 of various sizes and arrangements.

Similarly, the first fiber bulking module 110 and the second fiber bulking module 120 may comprise jets. A jet may comprise an orifice through which compressed air is expelled. The first fiber bulking module 110 and the second fiber bulking module 120 may comprise any number of jets and may comprise jets of various sizes and arrangements. Moreover, any number of bulking modules may be implemented and each bulking module may be separately configured with jets having different number and sizes and arrangements. However, unlike an air entangling module, a first fiber bulking module 110 and a second fiber bulking module 120 may be arranged to volumize layers comprising fiber tows, rather than entangle them.

Figure 4:
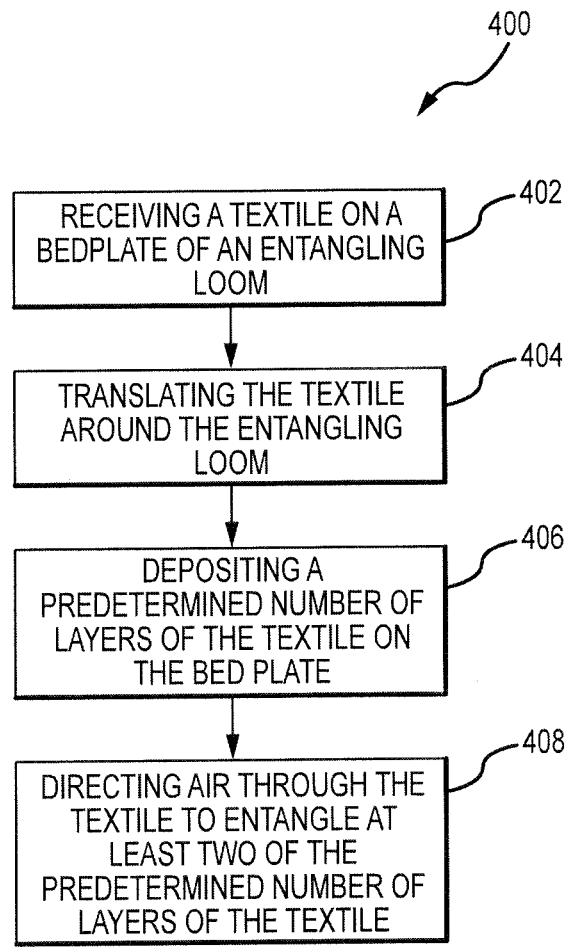
FIGS. 4-5 illustrate various example methods of air entanglement according to various embodiments.

Having described various aspects of an entangling system, a method of air entangling may include various steps. For example, with reference to FIG. 4, a method 400 may include receiving a textile on a bedplate of an entangling loom (Step 402). The textile may be translated about the entangling loom, for example, by rotating (Step 404). Furthermore, a predetermined number of layers of the textile may be deposited on the bedplate (Step 406). Finally, air may be directed through the textile to entangle at least two of the predetermined numbers of layers of the textile (Step 408).

In various embodiments, the directing air step 408 may occur subsequent to the rotating step 404. In further embodiments, the directing air step 408 may occur subsequent to both the rotating step 404 and the depositing step 406. However, and with reference to FIG. 5, in various embodiments, the directing air step 408 may coincide with the rotating step 404, and may continue until a predetermined number of layers of the textile are deposited (Step 406).

Figure 5:
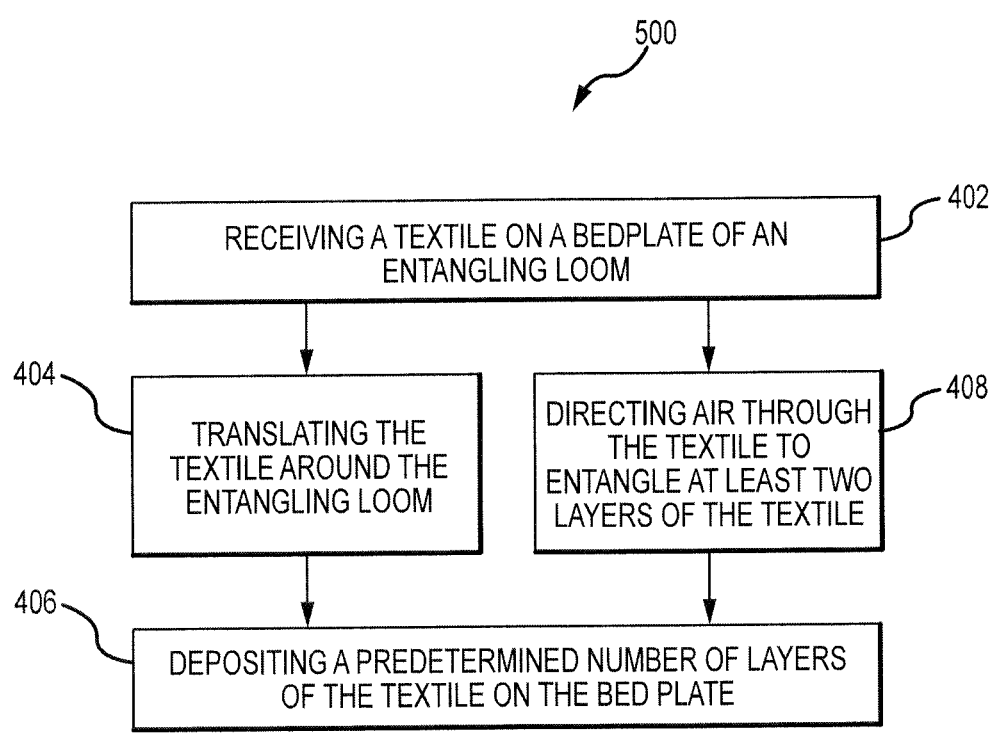

For example, with reference to FIG. 5, a method 500 may include receiving a textile on a bedplate of an entangling loom (Step 402). The textile may be rotated about the entangling loom (Step 404). At the same time, air may be directed through the textile to entangle at least two layers of the textile (Step 408). This may continue until a predetermined number of layers of the textile may be deposited on the bedplate (Step 406). Thus one may appreciate that the various steps of various methods may proceed in various different sequences, or may occur relatively simultaneously.

Benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An entangling system comprising:
    a bed plate whereon a first preform fiber layer and a second preform fiber layer accumulate;
    an air entangling module configured to direct a jet of air toward the first preform fiber layer and the second preform fiber layer on the bed plate; and
    a fiber packaging apparatus configured to transport the first preform fiber layer and the second preform fiber layer,
    wherein the bed plate comprises:
        an annulus having a planar upper surface on which the first preform fiber layer and the second preform fiber layer accumulate and comprising holes permitting passage of air through the bed plate.

2. The entangling system of claim 1, further comprising:
    a drive apparatus comprising a first roller set configured to receive the first preform fiber layer and guide the first preform fiber layer onto the bed plate and a second roller set configured to receive the second preform fiber layer and guide the second preform fiber layer onto the bed plate.

3. The entangling system of claim 1, further comprising:
a first fiber bulking module adapted to volumize the first preform fiber layer; and
a second fiber bulking module adapted to volumize the second preform fiber layer.

4. The entangling system of claim 2, wherein the first preform fiber layer comprises off-axis tows and wherein the second preform fiber layer comprises circumferential tows.

5. The entangling system of claim 2, wherein the first roller set comprises rollers radially translatable with respect to the bed plate whereby tows of the first preform fiber layer may be oriented in an off-axis orientation and spaced in a circumferential direction.

6. The entangling system of claim 1,
wherein the air entangling module comprises:
an upper air entangling member positioned above the bed plate; and
a lower air entangling member positioned below the bed plate.

7. The entangling system of claim 1, wherein the first preform fiber layer comprises a loose pre-assembled fabric layer.

8. A method for air entangling a textile to create a preform comprising:
receiving the textile on a bed plate of an entangling loom;
translating the textile around the entangling loom;
depositing a predetermined number of layers of the textile on the bed plate; and
directing air through the textile on the bed plate to entangle at least two of the predetermined number of layers of the textile,
wherein the bed plate comprises:
an annulus having a planar upper surface on which the predetermined number of layers accumulate and comprising holes permitting passage of air through the bed plate.

9. The method of claim 8, wherein the textile comprises alternate layers of circumferential fibers and off-axis fibers.

10. The method of claim 9, wherein the depositing comprises depositing a layer of circumferential fibers and a layer of off-axis fibers simultaneously.

11. The method of claim 10, wherein the directing occurs simultaneously with the translating.

12. The method of claim 10, wherein the directing occurs following the depositing.

13. The method of claim 10, wherein the directing occurs following the depositing and the translating.

14. The method according to claim 8, wherein the textile comprises carbonized carbon fibers.

15. The method according to claim 8, further comprising volumizing the textile prior to the translating.

* * * * *